Patented Jan. 22, 1952

2,583,204

UNITED STATES PATENT OFFICE 2,583,204

RESINOUS REACTION PRODUCTS OF CYCLOHEXANONES AND UNSATURATED DICARBOXYLIC ACIDS

Eric Albert Bevan, Halebank, Widnes, and Ralph Sidney Robinson, Woolton, Liverpool, England, assignors, by mesne assignments, to Reichhold Chemicals, Inc., Detroit, Mich., a corporation of Delaware No Drawing. Application May 28, 1947, Serial No. 751,129. In Great Britain June 4, 1946

12 Claims. (Cl. 260—63)

This invention relates to the manufacture of resinous products derived from certain dicarboxylic acids or anhydrides and ketones which resinous products may be solid, semi-solid or liquid.

It is an object of the present invention to provide a process for the manufacture of novel resinous products for use in the manufacture of surface coatings, binding compositions, plastic masses and the like.

It is a further object of this invention to provide new resinous polybasic acids which may be employed in the production of modified or unmodified alkyd resins. By the term "modified or unmodified alkyd resins" we means polyesters derived from polybasic acids (or anhydrides) which polyesters may be unmodified or they may be modified with any of the agents known for this purpose. Thus, in particular they may be modified by the incorporation of fatty oils or the acids or partial esters derived therefrom, or by natural or synthetic resins.

The present invention is especially concerned with a further development of the processes described in our co-pending application Serial No. 628,980, filed November 15, 1945, now abandoned.

The aforesaid application Serial No. 628,980 describes and claims a process for the manufacture of resinous products based upon the thermal reaction between an $\alpha\beta$ unsaturated ketone which does not itself contain conjugated ethylenic unsaturation and an $\alpha\beta$ unsaturated dicarboxylic acid, anhydride, ester, or non-resinous substituted derivative thereof.

In addition our co-pending application Serial No. 738,012, filed March 28, 1947, now abandoned, describes inter alia a process similar to those of application Serial No. 628,980 but employing ketones containing a further ethylenic linkage in conjugation with that already present in the position $\alpha\beta$ to the carbonyl group.

It has now been discovered according to this invention that the processes of applications Serial Nos. 628,980 and 738,012 can be extended to the reaction of certain dicarboxylic acids with certain ketones not containing $\alpha\beta$ ethylenic unsaturation, namely cyclohexanone and alkyl substituted cyclohexanones, provided these do not contain substituent groups in the positions alpha to the carbonyl group, if the removal from the system of any water present in the starting materials, added to the initial reaction mixture, or formed during the reaction is facilitated during the course of the reaction.

Accordingly the present invention provides a process for the manufacture of resinous products wherein cyclohexanone or a substituted cyclohexanone not containing a substituent group in the positions alpha to the carbonyl group is reacted by heating with an $\alpha\beta$ unsaturated dicarboxylic acid or anhydride containing four carbon atoms in the molecule and which, if capable of existing in geometrical isomeric forms, possesses the cis structure, the reaction being carried out under conditions whereby the removal of water from the system is facilitated at least during the later stages of the reaction.

In some cases it may be advisable to add a little water at the beginning of the process since this tends to increase the speed of the reaction always provided that water is removed from the system during the later stages of the reaction. When the initial reaction mixture possesses a moderate boiling point, as is the case when employing cyclohexanones and maleic anhydride, this removal of water may be effected by continuous azeotropic distillation. Other known methods however, may be employed such as the use of an open vessel, employment of reduced pressure or the addition of dehydrating agents, where the physical constants of the reactants are such as to permit these methods being carried out. It will be understood that two or more of these methods of removing water may be employed in conjunction with each other.

Examples of $\alpha\beta$ unsaturated dicarboxylic acids or anhydrides which may be employed in the process of this invention are maleic acid, maleic anhydride and acetylene dicarboxylic acid.

Cyclohexanone and methyl cyclohexanone are both commercially obtainable materials which may be used.

It will be understood that part of the cyclohexanone or alkyl substituted cyclohexanone can be replaced by any of the aldehydes or ketones described in our applications Serial Nos. 628,980 and 738,012.

According to a preferred embodiment of the invention, the cyclohexanone or substituted cyclohexanone and the $\alpha\beta$ unsaturated dicarboxylic acid or anhydride are heated together with stirring preferably in an inert atmosphere under conditions such that there is no loss of any volatile ingredient but allowing removal of water.

As in the cases of our applications Serial Nos. 628,980 and 738,012, an important embodiment of this present invention is the esterification of the polybasic acid adducts obtained by the reaction of the cyclohexanone or alkyl substituted cyclohexanone with $\alpha\beta$ unsaturated dicarboxylic acids, which esterifications may be modified by fatty oils and/or the fatty acids or partial esters derived therefrom by methods well known in the art of producing alkyd or ester resins. The fatty oils or their derivatives employed may be of the classes commonly referred to as drying, semi-drying, or non-drying.

In many cases the resinous adducts themselves can be made to dissolve directly in a fatty oil or fatty acids derived therefrom before esterification, or alternatively the fatty oil or fatty acids may be introduced at the start and reacted simultaneously during the preparation of the adducts of the cyclohexanone or alkyl substituted cyclohexanone and $\alpha\beta$ unsaturated dicarboxylic acid, and the product subsequently esterified with an alcohol for example glycerol. In some cases the adducts themselves are sufficiently soluble in the fatty acids derived from a fatty oil to allow the simultaneous condensation of adduct, fatty acids and alcohol to take place readily yielding a homogeneous resin. In other cases however it is necessary first to heat the adduct in the fatty acids until a homogeneous solution is obtained before the addition of the alcohol. Preferably the adduct is reacted with a partial ester derived from a fatty oil, containing free hydroxyl groups, with or without the addition of a further quantity of alcohol to complete the esterification.

Alcohols which may be employed in these processes include those of a polyhydric character such as pentaerythritol and glycerol, dihydric alcohols such as ethylene and propylene glycols, and monohydric alcohols, for example butyl, allyl, or cetyl alcohols.

It will be understood that in the preparation of esters, modified or unmodified, from these new resinous polybasic acid adducts, these adducts may be employed either as the sole polybasic acid component of such esters or in admixture with other polycarboxylic acids (or anhydrides). Other polycarboxylic acids which can be used if desired in addition to the resinous adducts obtained from aldehydes and $\alpha\beta$ unsaturated dicarboxylic acids include phthalic, sebacic, adipic, succinic, maleic and fumaric, or their anhydrides where these are known to exist.

Natural resins, fossil gums or synthetic resins may be added at any stage of the processes.

The processes may be carried out in the presence or absence of solvent.

When the adduct is made so as to contain one or more groups of a reactive nature, other than those associated with its acid properties, then this reactivity may be utilised by further reacting the adduct. Likewise any residual carbonyl groups retained in the adduct may be reacted either simultaneously with or subsequent to, the formation of the adduct with phenols, amines, ureas or sulphonamides.

Furthermore, we have found according to this invention that the cyclohexanone or alkyl substituted cyclohexanone and the $\alpha\beta$ unsaturated dicarboxylic acid or anhydride may be simultaneously reacted with other polymerisable substances such as styrene, methyl methacrylate and vinyl acetate. It is also possible in some cases to co-polymerise these polymerisable substances with the adducts formed from the cyclohexanone or substituted cyclohexanone and unsaturated acids. Copolymers obtained by such means may then be used as hereinbefore described as the polybasic acid component of alkyd resins.

The unesterified acid adducts made according to this invention are capable of forming salts by treatment with an inorganic salt, oxide or hydroxide. The alkali metal salts, e. g. sodium or potassium salts, and the ammonium salts are soluble in water and the soluble metal salts may be precipitated from aqueous solutions of these alkali metal salts by the addition of an aqueous solution of a soluble salt of an appropriate metal. In the treatment of textiles, insolubilisation may be effected by the formation of such insoluble metal salts in situ. The aqueous solutions thus described are also of interest in combination with aqueous emulsions of other film-forming materials such as are employed in water-paints, bituminous dispersions and rubber latex for the manufacture of new types of water paints and adhesives, and are also of interest for binding compositions used in the manufacture of linoleum and felting, and for the treatment of paper, textiles and other fibrous materials.

Solutions of the resinous condensation products manufactured according to this invention, in volatile solvents, can be applied in a variety of ways, for example, by spray, brush, dipping, or by roller coating, and may be applied to a variety of surfaces such as wood, metal, leather and textiles.

Useful coating compositions may be obtained by dissolving the resinous condensation products obtained by the processes hereinbefore described, in volatile solvent, from which hard glossy films are obtained by stoving at comparatively low temperatures. The polymerisation of such films may, in some cases, be considerably accelerated by the incorporation of a polymerisation catalyst such as benzoyl peroxide. Those products which have been modified with drying oils such as tung oil, linseed oil and dehydrated castor oil, or semi-drying oils, for example, sun-flower seed oil and soya-bean oil, or with the fatty acids or partial esters derived from these oils will dry, in film form, in the air under ordinary temperature conditions particularly if catalysed by the addition of driers such as cobalt, manganese and lead salts.

By mixing these new compositions with other film-forming materials, for example cellulose esters or ethers, such as nitro-cotton, and dissolving in appropriate solvents, valuable lacquers can be obtained which possess excellent adhesion to smooth surfaces. By employing products made according to this invention, which have been modified with non-drying oils such as castor oil and coconut oil, or with the fatty acids or partial esters derived therefrom, vary flexible resinous compositions can be obtained which serve to plasticise the films obtained from other film-forming materials such as cellulose esters and ethers.

Many of the compositions which can be prepared according to this invention, which in the absence of solvents are hard, tough plastic masses, are of interest in the manufacture of shaped articles.

Our process, briefly stated, comprises heat reacting a mixture comprising substantially equimolecular proportions of (1) a compound selected from a group consisting of cyclohexanone and an alkyl substituted cyclohexanone which is not substituted in the alpha position to the carbonyl group, and (2) a substance selected from a group consisting of maleic acid, maleic anhydride and acetylene dicarboxylic acid, and during the reaction continuously removing all water from the reaction zone.

The following examples illustrate how the processes of the invention can be carried into effect:

Example 1

150 grams of cyclohexanone, 150 grams of maleic anhydride and 0.5 ccs. of phosphoric acid were heated together at boiling point in a flask fitted with mechanical stirring and a reflux condenser to which was attached a trap filled with the volatile reactant, in this case cyclohexanone, such that any water present in the condensed vapours was removed before their return to the reaction mixture. During such boiling the temperature rose steadily as the reaction proceeded and as water was removed from the system by the trap. After 3 hours the temperature had risen to 200° C. and after 2½ hours at this temperature distillation had ceased, a total of 14.0 ccs. of water having been separated by the trap. The product was then, on cooling, a brown, clear, hard resinous polybasic acid having a melting point (Ring and Ball Method) of 71° C., and which was soluble in xylol, methylated spirits and acetone, but insoluble in mineral spirits and water. It was compatible with nitro-cotton and, on heating, with linseed oil, China-wood oil and linseed fatty acids.

Example 2

140 grams of cyclohexanone and 160 grams of maleic acid were reacted together using the same apparatus and procedure as employed for Example 1. The temperature rose to 200° C. in 2¾ hours, and after 1 hour at this temperature, the product was substantially identical with that of Example 1.

Example 3

150 grams of cyclohexanone, 150 grams of maleic acid and 30 grams of water were reacted together in the same manner as for Examples 1 and 2. In this case the temperatures rose to 200° C. in 2½ hours and after ½ hour at this temperature the product was substantially identical with that of Example 1.

Example 4

100 grams of cyclohexanone, 100 grams of maleic anhydride, 100 grams of xylol and 0.4 gram of phosphoric acid were boiled together under reflux, removing water from the condensed vapours by means of a trap as in Example 1. After 24 hours boiling in this manner, the xylol and unreacted cyclohexanone were distilled off leaving as the residual product a clear, hard brown resinous polybasic acid possessing physical characteristics generally similar to those of the products of Examples 1 to 3.

Example 5

70 grams of commercial methyl cyclohexanone and 90 grams of maleic anhydride were reacted together in a similar manner to that of Example 1. After 11 hours the temperature had risen to 200° C. and the product on cooling was a brown balsam of polybasic acid character. It was soluble in methylated spirits, acetone and xylol but insoluble in water and mineral spirits. It was also compatible on heating with linseed oil.

Example 6

37 grams of acetylene dicarboxylic acid and 30 grams of cyclohexanone were heated together as in Example 1. The temperature rose to 200° C. in 30 minutes and by this time the product on cooling, was a clear brown resinous polybasic acid possessing a melting point of 70° C. and which was soluble in methylated spirits and acetone but insoluble in water and mineral spirits. It was compatible on heating with linseed oil.

Example 7

200 grams of cyclohexanone, 100 grams of phenol and 300 grams of maleic anhydride were reacted together using the procedure of Example 1. After 10 hours the temperature had risen to 225° C. which temperature was then maintained until the resin on cooling was a hard solid. The product had a melting point of 78° C. and was soluble in acetone, xylol and methylated spirits, but insoluble in water and mineral spirits.

40 grams of this products were dissolved in 50 grams of a 20% aqueous solution of sodium hydroxide and to this was then added 16 grams of a 40% aqueous solution of formaldehyde. The resultant solution was maintained at 40° C. for 5 hours after which time it was neutralised by the addition of dilute hydrochloric acid. The precipitate obtained was washed free from soluble salts and then dried in a desiccator. A film flowed from a solution of this product in methylated spirits was found to become substantially insoluble and infusible after stoving for 30 minutes at 110° C.

Example 8

300 grams of maleic anhydride and 200 grams of cyclohexanone were heated together in an apparatus similar to that used in Example 1, but with the addition of a dropping funnel. On reaching 125° C., 105 grams of styrene were added slowly and continuously through the dropping funnel during a period of 1½ hours during which the temperature was maintained at 125° C. The temperature was then allowed to rise until 225° C. was reached, this temperature then being held for a further hour. The product was then, on cooling, a clear, hard, brown resinous polybasic acid having a melting point of 80° C. and which was soluble in acetone and butyl acetate and insoluble in mineral spirits and water. It was compatible with nitro-cotton.

Example 9

150 grams of alkali-refined linseed oil, 75 grams of cyclohexanone and 75 grams of maleic anhydride were reacted together, again using the procedure of Example 1. The temperature rose to 230° C. in 19 hours and the product was then, on cooling, a clear brown balsam having polybasic acid properties. It was soluble in xylol, mineral spirits and acetone, and was compatible, on heating, with linseed oil.

This resin when heated with 30% of its weight of glycerol, gelled after only 10 minutes at 190° C.

Example 10

100 grams of gum rosin, 100 grams of cyclohexanone and 120 grams of maleic anhydride were reacted together, again employing the procedure of Example 1. The temperature rose to 220° C. in 4½ hours and the product was then, on cooling, a clear, light brown, hard resin having a melting point of 95° C. and which was soluble in methylated spirits, acetone and xylol, but insoluble in water and mineral spirits. It was also compatible with linseed oil on heating, and with nitro-cotton.

Example 11

100 grams of the product of Example 1 were heated with 58 grams of glycerol under an atmosphere of carbon dioxide in a flask fitted with mechanical agitation. After 8 hours at 200° C. the product was a clear, brown, very hard resin having a melting point of 160° C. and an acid number of 26. It was compatible on heating with linseed fatty acids but not with linseed oil. Heating for a further hour at 200° C. brought about gelation.

Example 12

175 grams of the product of Example 1 and 100 grams of n-butyl alcohol were heated together in an apparatus similar to that used in Example 1, the water-trap in this case being filled at the start with n-butyl alcohol. After 20 hours the temperature had risen to 250° C. and the product then had an acid number of 70 and a viscosity of approximately 200 poises. It was compatible with nitro-cotton and with linseed oil.

Example 13

200 grams of the product of Example 8 and 117 grams of glycerol were heated together as in Example 11. After of 3¾ hours at 180° C., the product was a clear, brown, hard resin which possessed a melting point of 95° C. and an acid number of 18. It was not compatible with either linseed oil or nitro-cotton.

Example 14

137 grams of a partial ester prepared by alcoholysing 118 grams of refined linseed oil by 19 grams of glycerol, and 43 grams of the products of Example 1 were heated together under an atmosphere of carbon dioxide in a flask fitted with a mechanical stirrer. After 10 hours at 240° C. the product had an acid number of 3 and a viscosity of approximately 50 poises at 25° C. A film brushed out from this resin with the addition of the normal cobalt/manganese/lead driers airdried overnight and possessed good gloss, water-resistance and adhesion.

Example 15

48 grams of the product of Example 1, 100 grams of linseed fatty acids and 33 grams of glycerol were heated together as in Example 14. After 11 hours at 225° C. the product had an acid number of 4. A solution of this resin in mineral spirits and with the addition of the normal cobalt/manganese/lead driers was brushed out into a film-form and this air-dried in 4 hours. A solution of the same resin in xylol without driers was found to give films which became hard and glossy when stoved at 120° C. for 20 minutes. Further heating of the resin at 225° C. brought about gelation in 1½ hours.

Example 16

227 grams of castor oil, 20 grams of glycerol and 50 grams of the product of Example 1 were heated together as in Example 14. After 5 hours at 220° C. the product had an acid number of 12 and a viscosity of approximately 50 poises. It was found to serve as an efficient plasticiser for nitrocotton and for a butyl-etherified urea-formaldehyde resin.

Example 17

116 grams of a partial ester made by alcoholysis of 100 grams of refined linseed oil with 16 grams of glycerol, 22 grams of the product of Example 1, 22 grams of phthalic anhydride and 11 grams of additional glycerol were heated together as in Example 14. After 6 hours at 225° C. the product had an acid number of 2.6 and a viscosity of approximately 200 poises at 25° C. A film brushed out from a solution of this resin in mineral spirits, with the addition of the normal cobalt/manganese/lead driers, was found to air-dry in approximately 9 hours and this dried film possessed good gloss and water-resistance.

Example 18

100 grams of the product of Example 1 were dissolved in 26 grams of a 10% solution of sodium hydroxide. A piece of finely woven cotton cloth was impregnated with this solution and then subsequently immersed in a 5% aqueous solution of alum so as to precipitate the aluminium salt of the resin onto the fibres of the cloth. It was then lightly rinsed and hot-pressed. When dry the cloth was found to have water-repellent properties.

What we claim is:

1. A process for the manufacture of synthetic resinous condensation products which comprises heat reacting a mixture comprising substantially equimolecular proportions of (1) a compound selected from a group consisting of cyclohexanone and an alkyl substituted cyclohexanone which is not substituted in the alpha position to the carbonyl group and (2) a substance selected from a group consisting of maleic acid, maleic anhydride and acetylene dicarboxylic acid, and during the reaction continuously removing all water from the reaction zone.

2. A resinous condensation product produced according to claim 1.

3. A process as set forth in claim 1 wherein reactant (1) is cyclohexanone.

4. A process as set forth in claim 1 wherein reactant (1) is methyl cyclohexanone.

5. A process as set forth in claim 1 wherein reactant (2) is maleic anhydride.

6. A process as set forth in claim 1 wherein reactant (2) is maleic acid.

7. A process as set forth in claim 1 wherein the reaction product is esterified.

8. A process as set forth in claim 1 wherein the reaction product is esterified by the addition of a nonesterified alcohol.

9. A process as set forth in claim 1 wherein the reaction product is treated to form a metal salt thereof.

10. A product produced according to claim 9.

11. A process as set forth in claim 1 wherein styrene is employed as a third reactant.

12. A resinous product produced according to claim 11.

ERIC ALBERT BEVAN.
RALPH SIDNEY ROBINSON.

REFERENCES CITED

The following references are of record in the file of this patent:

UNITED STATES PATENTS

| Number | Name | Date |
|---|---|---|
| 2,057,766 | Brubaker | Oct. 20, 1936 |
| 2,121,183 | Binapfl | June 21, 1938 |
| 2,361,019 | Gerhart | Oct. 24, 1944 |
| 2,392,139 | Gerhart | Jan. 1, 1946 |
| 2,467,958 | Bloch | Apr. 19, 1949 |